United States Patent [19]

Battistini

[11] Patent Number: 4,562,772

[45] Date of Patent: Jan. 7, 1986

[54] TOMATO PEELING DEVICE OPERATING THROUGH VACUUM AND TEMPERATURE

[75] Inventor: Isócrate N. Battistini, Godoy Cruz, Argentina

[73] Assignee: Talleres Metalurgicos "Condor" Battistini & Cia, S.A., Mendoza, Argentina

[21] Appl. No.: 671,974

[22] Filed: Nov. 16, 1984

[30] Foreign Application Priority Data

Nov. 16, 1983 [AR] Argentina ............................. 294839

[51] Int. Cl.[4] ............................................. A23N 7/00
[52] U.S. Cl. ...................................... 99/472; 99/516; 99/584
[58] Field of Search ................. 99/472, 467, 469, 470, 99/483, 516, 584, 540, 567, 537; 426/481, 482, 509

[56] References Cited

U.S. PATENT DOCUMENTS

| | | | |
|---|---|---|---|
| 3,769,439 | 10/1973 | Kafejiev et al. | 99/472 X |
| 3,853,049 | 12/1974 | Wilkerson | 99/584 |
| 4,026,203 | 5/1977 | Levati | 99/472 |
| 4,092,910 | 6/1978 | Genchev et al. | 99/472 |
| 4,437,398 | 3/1984 | Savi | 99/584 X |

Primary Examiner—Timothy F. Simone
Attorney, Agent, or Firm—Birch, Stewart, Kolasch & Birch

[57] ABSTRACT

The present invention relates to a new and useful tomato peeling device which operates through vacuum and temperature and which by employing simple and common elements renders high performance and reduces manufacturing costs. The device is mainly comprised of an endless conveyor joined to two lateral chains guided by coaxial wheels travelling in a path of a rotary cylindrical drum which is connected to a vacuum pump, all of the cited elements being capable of treating fresh tomatoes and delivering pulp devoid of skin.

3 Claims, 4 Drawing Figures

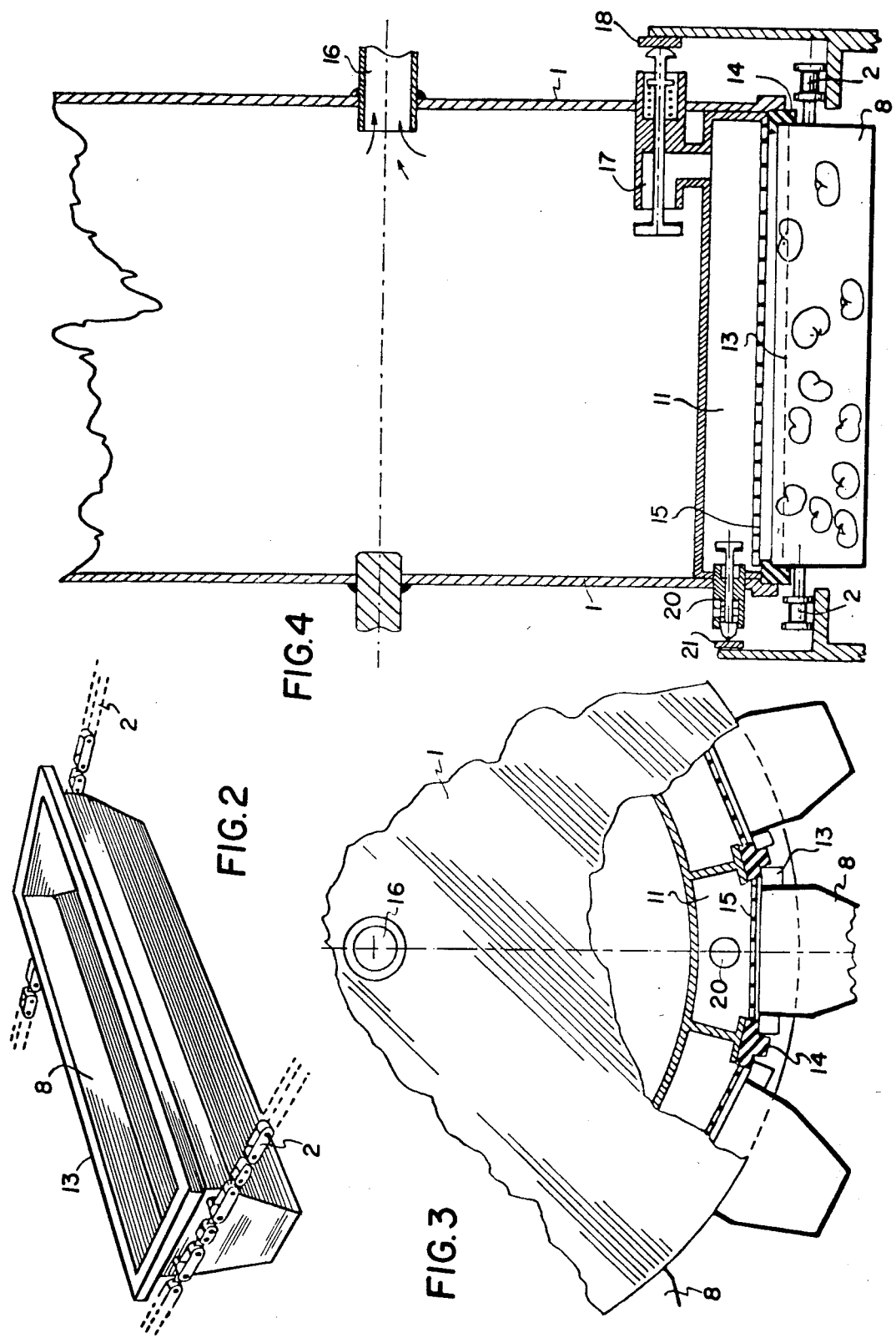

TOMATO PEELING DEVICE OPERATING THROUGH VACUUM AND TEMPERATURE

The present invention relates mainly to a tomato peeling device operating by vacuum after heating of said vegetables, such device being capable of working continuously which implies a significant constructive simplification and operating conditions that avoid subjecting elements to pressing or alternative requirements which may give rise to both costly maintenance and quite reduced useful life.

More specifically, the present invention relates to a device of the type outlined above and which belongs to the known kind of those based on the principle of subjecting tomatoes to a scalding stage where the peel is cooked without altering the pulp thereof, and thereafter subjecting the tomatoes to vacuum thus causing expansion of the pulp so that the cooked peel which is nondilatable will separate from the pulp; moreover, the present invention incorporates a new combination of operating means for overcoming a number of complexities and insufficiencies shown by known devices and essentially improving performance.

The known machines of the cited type are based, constructively, on combinations of means comprising a plurality of containers, preferably in the shape of trays, which progresses carried by two parallel endless chains, over which coverings are disposed that travel together with said containers in a certain straight length of its path, during which vacuum is produced causing separation of the peel from tomatoes contained in said trays after scalding. This combination of means require unavoidably the inclusion of elements moving alternatively or reciprocatingly in order to repeat the process of applying vacuum in the containers that progress, whether acting individually or in groups.

The oldest of these machines work under a limited degree of vacuum which, in view of the reduced term employed for acting upon tomatoes, usually seems insufficient to achieve separation of the peel, especially if those tomatoes are not completely ripe. Upon proving that better results are obtained when vacuum is applied intermittently, that is, by pulses causing different and successive expansion in the pulp and originating a considerable increase in peel fracture, machines were built constituting an evident step forward in the technique because they do not require high degree of vacuum and separate practically all the skin, whatever the tomato ripeness may be.

Although the results are improved with such new embodiments, the devices in themselves continue with the same cited conditions of requiring complex and costly constructions of expensive maintenance having reduced useful life of most of its members, especially on account of not having removed the intervention of reciprocating elements.

With the device of the present invention all of the above drawbacks are overcome since it consists in a combination of means properly interrelated that operate continuously without any interruption, such aspect implying a safer and simpler operation, with members subjected to less rigorous conditions enabling them to extend their useful life and to require maintenance works much simpler and less expensive.

The main aspect of this new constructive and functional embodiment resides in the provision of a substantially cylindrical rotary drum on horizontal axis, the cavity of which is in communication with a vacuum source, in its peripheral cylindrical surface having a plurality of open outer face compartments located such that they may engage successive especial containers that progress carried by two conventional chains of continuous one-way operation, so that during a portion of the path suction is produced from said compartments after which they are left to return to atmospheric pressure after separating peel from pulp of the tomatoes received in such containers; later, said containers will be overturned so that products will be delivered with pulp devoid of peel to be further treated in conventional equipments.

During the progressing path, the outer apertures of the rotary drum compartments make a close and sealed fit in the upper inlets of the containers, which are in the shape of buckets having flat edge frames so designed for the purpose of ensuring sealing in coupling with the compartments.

In turn, said peripheral compartments of the drum are in communication with the inner cavity thereof, normally closed line valves being interposed in such a manner as to open when passing in front of the length where containers are coupled, and producing suction from the interior of the drum. Furthermore, immediately after said length of intercommunication between compartments, containers and the inner cavity of the drum, said compartments traverse a short length in which other normally closed valves are open to admit outer air and to let the container return to atmospheric pressure, precisely at the time in which each container starts separating from the corresponding compartment wherein it was subjected to vacuum.

Upon travelling, the containers keep being carried by chains, with their upper inlets completely open until another length of the path in which they change position and overturn so that the contents will be dropped in conventional elements.

Said continuous travel leads the containers up to the start of its path wherein they are charged with previously conventionally scalded tomatoes and, before going under said drum for the application of vacuum, they pass under a continuous sweeping element which acts on the upper surface of said containers in order to clean its edges and remove residues so that a perfect sealed joint is ensured when they have to face the edges of said compartments of the rotary drum.

In order to ensure said sealing, the device has elastomeric joints mating with the perimetral edges of the compartments which make a close fit with the upper frames of the containers in the shape of buckets.

It is to be understood that the travelling speed of the upper frames of the containers must be the same as the tangential speed of the perimetral edges of the compartments in the rotary drum.

In order to materialize the above discussed advantages, to which users and experts in the art will be able to add many more, and so as to facilitate the understanding of the constructive, constitutive and functional features of the device of the present invention, reference will be made hereafter to a preferred embodiment, which is schematically illustrated without a predetermined scale in the annexed drawings, but it is to be borne in mind that such exemplified embodiment is not to be considered as limitative or exclusive of the scope of protection desired for the present invention but rather it is provided only with explanatory or illustrative purposes as to the basic concept of the invention.

FIG. 2 is a schematic perspective view of one of the containers or buckets receiving tomatoes to be treated with the device in order to separate peel from pulp;

FIG. 3 is an elevation view and partial section of an inner portion of the rotary drum having the device illustrated in FIG. 1; and FIG. 4 is a vertical and axial section of the same portion corresponding to FIG. 3.

In the drawings, the same parts or elements are always designated by the same reference numerals with the purpose of illustrating the preferred embodiment of the tomato peeling device of the present invention.

Figure 1:
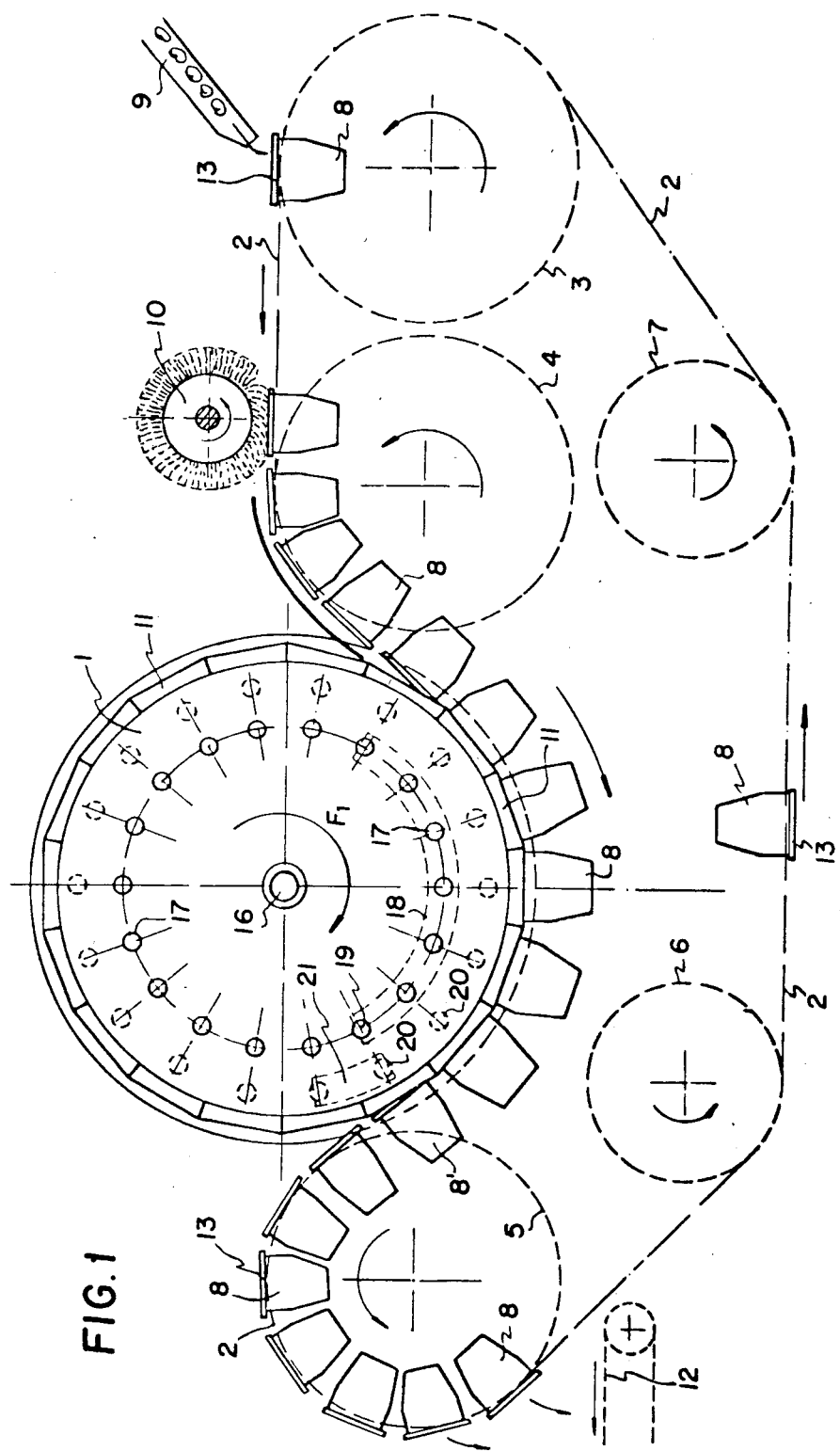
FIG. 1 is a schematic view in side elevation of a tomato peeling device acting under vacuum according to the present invention.

As may be appreciated in FIG. 1, the device according to the invention comprises a rotary drum 1 rotating in the direction of arrow $F_1$ with the same tangential speed as two endless parallel chains 2 mounted on wheels 3, 4, 5, 6 and 7 which in turn support a plurality of buckets 8 passing successively under a tomato feeder 9, such tomatoes having been previously scalded in conventional manner; a continuous sweeper 10 which for the purposes of illustration has been designed as a cylindrical brush rotating in a direction opposite to the travel of the buckets, under a group of inlets 11 of compartments placed in the cylindrical periphery of said rotary drum and over an overturning length of contents defined by the path of said containers guided by lateral wheels 5, thus producing drop of products over a receiving member 12, in this case a continuous conventional conveyor.

Each container or bucket 8 has an upper inlet constituted by a rectangular frame 13, as may be seen in FIG. 2, which must be flat so as to enable cleaning thereof with the sweeper 10 and ensure close sealing fit with the perimetral edge of each compartment 11.

In FIGS. 3 and 4 it may be seen that each compartment 11 has its inlet completely open and provided of an elastomeric joint 14, and also includes a network 15 mating with each inlet.

The rotary drum 1 is, for example through a coaxial tube 16, in communication with an appropriate suction pump, not shown. Also, its internal cavity communicates with each one of compartments 11 via respective flow valves 17 normally closed, such as that illustrated in FIG. 4, which by means of an outer runner 18 are progressively open in a length of circumferential arc, as may be seen in FIG. 1. Whilst buckets 8 travel, coupled to their respective compartments 11, in front of said arc runner 18, suction from within the drum extends through these compartments and consequently, acts on said buckets up to reaching position 19 in which suction is interrupted and air admission begins through a valve 20 which opens by the action of another shorter arc runner 21; it is precisely at this point where a bucket 8 begins to separate with its contents at atmospheric pressure, and goes on in the arcuate length corresponding to side wheels 5 in order to drop the contents on the receiving member.

From the foregoing disclosure it may be understood that the assembly of constituent elements of the device of the present invention comprises elements, all of which are of simple operation and receive minimal stresses for which reason maintenance thereof is cheap. In addition, it is to be borne in mind the continuous operation, without interruptions, without elements subjected to reverse movements, etc.

Upon carrying into practice the device thus disclosed and exemplified, many amendments or improvements may be introduced therein without departing from the scope of protection desired for the present invention, scope which is specifically indicated in the annexed claims.

We claim:

1. A device for peeling tomatoes and the like under vacuum upon receipt from previous and sufficient heating means for swelling the pulp thereby rupturing the skin, including means for discharging said heated tomatoes or the like into a plurality of containers, means for coupling each of said containers to respective vacuum suction openings, means for exhausting said suctioned air thereby separating the ruptured skin from the pulp while said plurality of containers continually progress on a first endless conveyor, comprising:

means for admitting air at atmospheric pressure into said continually progressing containers;
    means for depositing said peeled tomatoes or the like on a second conveyor means;
    rotating drum means having a plurality of compartments located in the cylindrical periphery thereof for sealingly engaging said plurality of container means;
    said rotating drum having an internal cavity in communication with a vacuum pump and with each of said compartments;
    said container means having an upper inlet in the shape of a flat rectangular frame corresponding to respective flat rectangular inlet frames on said compartments;
    a plurality of first valve means operatively associated with said vacuum suction openings, wherein each of said vacuum suction openings is coupled to one of said plurality of container means;
    a plurality of second valve means operatively associated with said means for admitting air at atmospheric pressure, wherein each of said plurality of second valve means for admitting air at atmospheric pressure is coupled to one of said plurality of container means;
    said rotating drum means being operatively engaged to said first valve means throughout a first arcuate portion of said rotating drum means;
    said rotating drum means being operatively engaged to said second valve means throughout a second arcuate portion of said rotating drum means;
    said first arcuate portion defining a distance over which said vacuum suction is applied for separating the ruptured skin from the pulp;
    said second arcuate portion defining a distance over which the air at atmospheric pressure is admitted into said container;
    the sum of said first and second arcuate portions defining a distance over which said containers are in contact with said associated compartments on said rotary drum; and
    sweeper means for continuously cleaning said upper rectangular frame inlets of said plurality of container means.

2. Tomato peeling device according to claim 1, wherein a like amount of elastomeric joints are fixed in mating relationship with said compartment inlets and with respective close sealing fits.

3. Tomato peeling device according to claim 1, wherein respective metallic networks are applied in mating relationship with said compartment inlets of said rotating drum.

* * * * *